United States Patent

Bhattacharjee et al.

(10) Patent No.: US 9,959,245 B2
(45) Date of Patent: May 1, 2018

(54) ACCESS FREQUENCY APPROXIMATION FOR REMOTE DIRECT MEMORY ACCESS

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, Chappaqua, NY (US); Kenneth A. Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 14/755,835

(22) Filed: Jun. 30, 2015

(65) Prior Publication Data

US 2017/0004110 A1 Jan. 5, 2017

(51) Int. Cl.
G06F 15/167 (2006.01)
G06F 15/173 (2006.01)
H04L 12/26 (2006.01)

(52) U.S. Cl.
CPC ........ G06F 15/17331 (2013.01); H04L 43/06 (2013.01); H04L 43/08 (2013.01); H04L 43/16 (2013.01)

(58) Field of Classification Search
CPC ......... G06F 17/30463; G06F 17/30864; G06F 17/30469; H04L 43/08; H04L 43/16
See application file for complete search history.

(56) References Cited

U.S. PATENT DOCUMENTS

| 8,161,241 | B2 | 4/2012 | Bhattacharjee et al. | |
| 9,015,426 | B2 | 4/2015 | Stabrawa et al. | |
| 2007/0239791 | A1* | 10/2007 | Cattell | G06F 17/3048 |
| 2007/0239806 | A1* | 10/2007 | Glover | G06F 11/1435 |
| 2011/0137861 | A1* | 6/2011 | Burnett | G06F 17/30348 707/622 |
| 2011/0173395 | A1* | 7/2011 | Bhattacharjee | G05D 23/19 711/135 |
| 2012/0221803 | A1* | 8/2012 | Stabrawa | G06F 3/0611 711/154 |
| 2013/0275631 | A1* | 10/2013 | Magro | G06F 13/14 710/28 |

(Continued)

OTHER PUBLICATIONS

M. Canim et al., "SSD Bufferpool Extensions for Database Systems," Proceedings of the VLDB Endowment, Sep. 2010, pp. 1435-1446, vol. 3, No. 1-2.

(Continued)

*Primary Examiner* — Peling Shaw
(74) *Attorney, Agent, or Firm* — Yeen Tham; Ryan, Mason & Lewis, LLP

(57) ABSTRACT

A method includes the following steps. One or more records are accessed from a database memory bypassing a database access mechanism of a database system. Data representing access frequency of the one or more records are collected. The collected access frequency data for the one or more records are maintained. The access frequency data for the one or more records are aggregated until the access frequency reaches a threshold value. The aggregated access frequency data are asynchronously reported for the one or more records to the database system.

19 Claims, 6 Drawing Sheets

(56) References Cited

U.S. PATENT DOCUMENTS

| | | | |
|---|---|---|---|
| 2015/0120689 A1* | 4/2015 | Miao | G06F 17/30864 |
| | | | 707/706 |
| 2016/0026605 A1* | 1/2016 | Pandit | G06F 15/17331 |
| | | | 709/212 |
| 2016/0224688 A1* | 8/2016 | Baranczyk | G06F 17/30463 |
| 2016/0232206 A1* | 8/2016 | Hayamizu | G06F 17/30477 |

OTHER PUBLICATIONS

B. Bhattacharjee et al., "Storage Class Memory Aware Data Management," IEEE Data Engineering Bulletin, 2010, pp. 35-40, vol. 33, No. 4.

M. Canim et al., "An Object Placement Advisor for DB2 Using Solid State Storage," Proceedings of the VLDB Endowment, Aug. 2009, pp. 1318-1329, vol. 2, No. 2, Lyon, France.

* cited by examiner

ACCESS FREQUENCY APPROXIMATION FOR REMOTE DIRECT MEMORY ACCESS

FIELD

The present application generally relates to database systems and, more specifically, to tracking access frequency when memory access is based on a direct memory access protocol bypassing the database.

BACKGROUND

A database system generally includes both volatile memory and non-volatile storage. Volatile memory devices (e.g., random access memory) provide faster access times than non-volatile storage devices (e.g., magnetic or optical disks). To take advantage of the speed of volatile memory, a buffer pool may be used. A buffer pool is memory used to cache blocks of memory, such as pages, as the blocks are being read from mechanical disk, or being modified in memory. The buffer pool improves performance by allowing data to be accessed from memory instead of from disk. However, the buffer pool contains a fixed amount of memory. Once the buffer pool is full or near capacity, storing new data in the buffer pool requires replacing or evicting data that already resides in the buffer pool with the new data. Several data replacement strategies have been developed to determine which of the data currently residing in the buffer pool are to be overwritten with the new data (i.e., replaced or evicted). Some of these strategies include replacing the least recently used (LRU) data, replacing the data that has been in the buffer the longest (First-In/First-Out, or FIFO), or replacing the newest data in the buffer (Last-In/First-Out, or LIFO).

SUMMARY

Embodiments of the invention provide techniques for tracking access frequency when database access is based on a direct memory access protocol bypassing the database access mechanism.

In one embodiment, a method comprises the following steps. One or more records are accessed from a database memory bypassing a database access mechanism of a database system. Data representing access frequency of the one or more records are collected. The collected access frequency data for the one or more records are maintained. The access frequency data for the one or more records are aggregated until the access frequency reaches a threshold value. The aggregated access frequency data are asynchronously reported for the one or more records to the database system.

In another embodiment, a method comprises the following steps. One or more records are maintained in a database memory. One or more access frequency data structures are maintained for the one or more records in the database memory. A database memory replacement policy is employed. Access frequency data for the one or more records in the database memory are asynchronously received from one or more clients.

DETAILED DESCRIPTION

Figure 1:
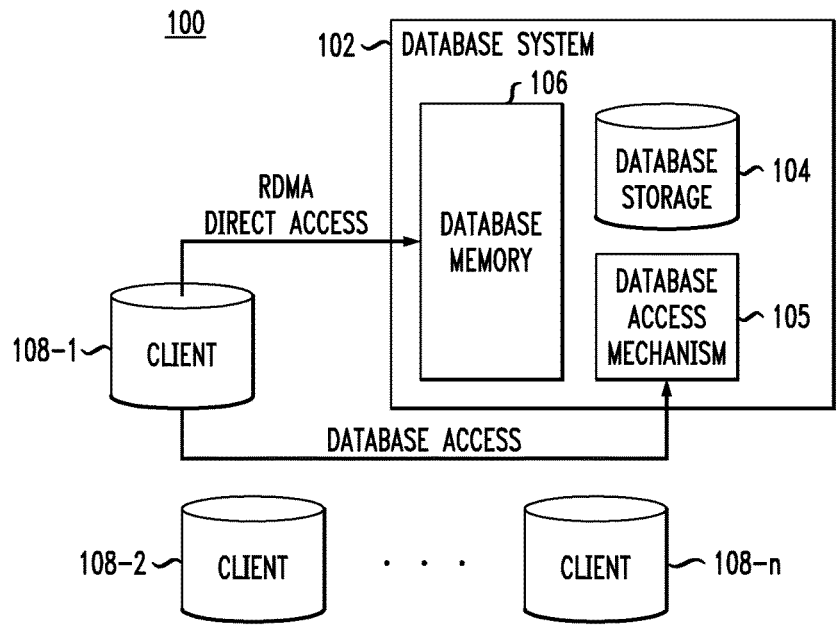
FIG. 1 depicts a direct memory access method bypassing a database access mechanism.

Illustrative embodiments of the invention may be described herein in the context of illustrative methods, systems and devices for tracking access frequency when a database memory (e.g., a buffer pool) is directly accessed and the entire database access mechanism is bypassed, for example, when memory access is based on a Remote Direct Memory Access (RDMA) protocol. However, it is to be understood that embodiments of the invention are not limited to the illustrative methods, systems and devices but instead are more broadly applicable to other suitable methods, systems and devices. Furthermore, while embodiments are described herein with reference to memory access using a RDMA protocol, other memory access protocols may be used, it is to be understood that embodiments of the invention may be applied to general memory access frequency tracking when accessing memory using a direct access method over a distributed shared memory.

A database system includes memory (e.g., cache or buffer pool), storage, and a database access mechanism (e.g., a query language such as SQL, API or any other suitable interface). Typically, the client uses the query language provided by a database system to access the data. However, when direct memory access methods are used (e.g., through a RDMA protocol), the client directly accesses the database memory and bypasses the database access mechanisms. In other words, the client is not using the provided query language to access the data within the database system.

As used herein "database storage" illustratively refers to a portion of a database system implemented in one or more non-volatile storage devices of the database system, e.g., magnetic and/or optical disks, storage arrays, RAIDs, etc.

As used herein "database memory" illustratively refers to a portion of a database system implemented in one or more volatile memory devices of a database system, e.g., RAM, cache, buffer pool, etc.

There is a new paradigm in data storage management, which provides two different access methods to data: 1) traditional access through database application programming interface (API); and 2) remote direct memory access bypassing database interface by caching memory location of data. In the traditional access method, the database system is able to gather accurate statistics on access frequency to determine the hotness and/or coldness of record and pages. A "cold" record is one that is accessed infrequently or has not been accessed. A "hot" record is one that is accessed frequently, or accessed recently. When a buffer pool is nearing capacity or is full, data within the data pool must be replaced or evicted to make room for new data. The decision of which data to evict depends on the access frequency of the records within the buffer pool. For example, under the LRU replacement policy, the least recently used record(s) may be selected for eviction. As such, collecting and maintaining up-to-date and accurate access frequency data for the records within a buffer pool is essential to management of the buffer pool.

However, when employing a direct access method, the database layer is bypassed, which provides faster latency at the cost of lost statistics. That is, when the database layer is bypassed under the direct access method, an access to a record is no longer logged with the database and the database does not have the necessary information to make a correct choice of which record(s) to evict from the buffer pool. Therefore, under the direct access method, the main challenge is in gathering statistics when data within the database is exposed to external users through remote direct memory access.

Embodiments described herein provide a method to track access frequencies and implement memory eviction policy when the operations are executed through direct memory access.

Advantageously, in embodiments described herein, data is first accessed through the database layer, the address of fetched records are cached on the client, and all subsequent access to the same records are performed through RDMA. Key (e.g., data or records) fetch are done synchronously, however the access frequency for each record is collected over time. These collected statistics are sent over to a database system asynchronously without interfering with time-sensitive record fetching. The statistics are received by the database system to implement an eviction policy (e.g., LRU policy) for database memory management. In addition, each client may send the collected statistics periodically based on max-heap priority.

FIG. 1 depicts a database system environment 100 comprising a database system 102 (which can be implemented on one or more servers) and clients 108-1, 108-2, . . . , 108-*n* (which can be implemented on one or more client devices). The database system 102 comprises a database storage 104, a database access mechanism 105 and a database memory 106, from which the clients 108-1, 108-2, . . . , 108-*n* may access one or more records. As noted earlier, the database access mechanism 105 may be a query language such as SQL, API or any other interface. Illustratively, when client 108-1 accesses a record (e.g., perform a read or write operation) for the first time, the client 108-1 will access the record through the database storage 104 using database access mechanism 105. However, the address of the fetched record will be cached at database memory 106 (which may comprise a buffer pool in one embodiment) and all subsequent accesses to the same record from the client can be performed through a direct access method, such as RDMA, to database memory 106, thereby bypassing database access mechanism 105. As noted earlier, under this direct access method, the database system 102 is unable to accurately gather statistics on access frequency data for each record.

Advantageously, embodiments described herein provide a method for collecting access frequency data for each record when the records are accessed remotely, for example, via a RDMA protocol.

Figure 2:
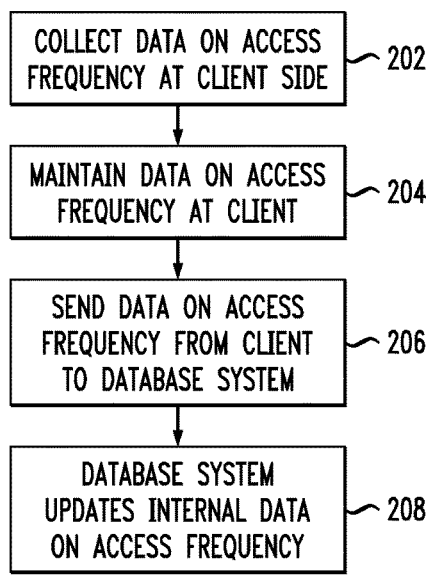
FIG. 2 depicts an overview process of an access frequency tracking method, according to an embodiment of the invention.

FIG. 2 depicts an overview process 200 of the techniques described herein. At step 202, data related to access frequency for one or more records are collected at the client's side. At step 204, the collected data is maintained at the client, for example, as a table, a list, etc. At step 206, data on access frequency for the one or more records is sent to the database system from the client. For example, the access frequency data may be sent once the frequency reaches a specified threshold (e.g., a particular record has been accessed at least five times). At step 208, the database system updates its internal data structure(s) based on the received access frequency data for the one or more records.

Figure 3:
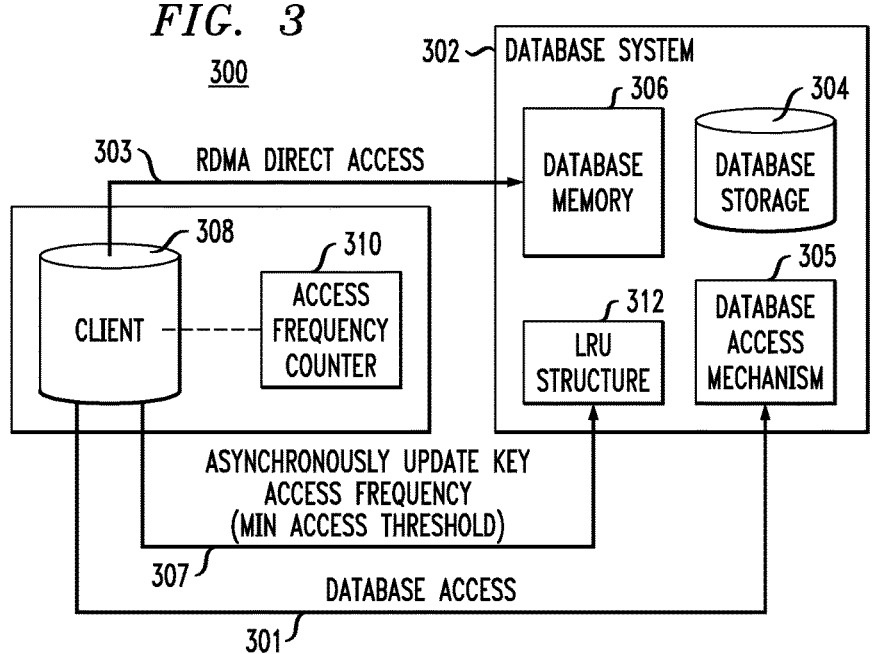
FIG. 3 depicts a database system environment implementing the method of FIG. 2, according to an embodiment of the invention.

FIG. 3 depicts a database system environment 300 in which the process 200 of FIG. 2 is carried out. Database system environment 300 comprises database system 302, which includes database storage 304, database access mechanism 305, database memory 306 and a LRU structure 312. While a LRU policy is used in the embodiment shown in FIG. 3, other suitable database memory replacement policies may be used, such as a FIFO or LIFO policy. The database system environment 300 also includes one or more clients 308 (as shown in FIG. 1). For ease of illustration, only one client 308 is shown in FIG. 3. Client 308 includes an access frequency counter 310 for tracking the client's access frequency for one or more records. When client 308 accesses a record for the first time, represented by path 301, the client accesses the record via the database 304 using database access mechanism 305. Subsequently, the client 308 may access the record from the database memory 306 via a RDMA protocol, as represented by path 303, thereby bypassing the database access mechanism 305. Each time client 308 accesses a particular record, access frequency counter 310 tracks and increments the access frequency for the particular record. When the access frequency for a record reaches a predetermined threshold (e.g., a record has been accessed five times, ten times, etc.), the client 308 sends a message to database system 302 with the aggregated access frequency data for the one or more records that has reached the threshold value, represented by path 307. It is to be noted that the threshold is a variable parameter, the value may be set by a user or set automatically. The lower the threshold value, the more often that updates would have to be sent to the database system 302. Similarly, the higher the threshold value, the less frequent that the updates would have to be sent to the database system 302. Upon receipt of the access frequency data, the database system 302 may update its internal data structure, for example, LRU structure 312, for the access frequency of the particular record. Data structures within the database system 302 may also accessible by the client(s) 308, and the client(s) 308 may directly increment the access frequency for any particular record. Notably, the updates are performed asynchronously and periodically. Based on the updated access frequency data from the one or more clients 308, the database system 302 is able to implement its buffer pool replacement policy more accurately.

Figure 4:
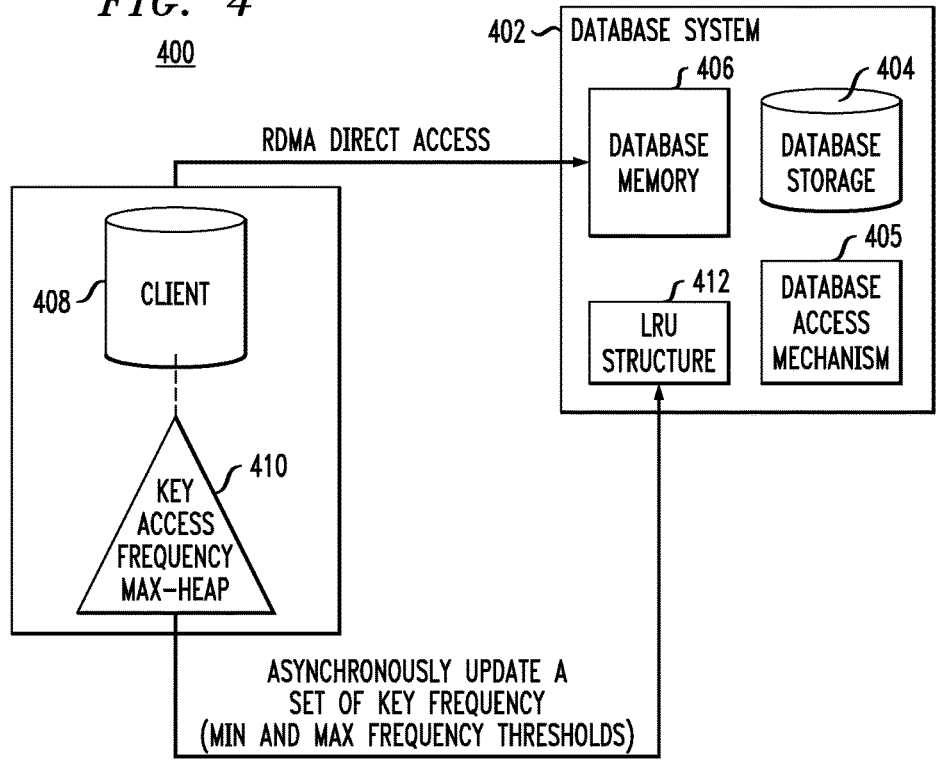
FIG. 4 depicts a database system environment implementing the method of FIG. 2, according to another embodiment of the invention.

FIG. 4 depicts an alternative embodiment of the process 200 as implemented in a database system environment. Database system environment 400 comprises database system 402, which includes database storage 404, database access mechanism 405, database memory 406 and a LRU structure 412. The database system environment 400 also includes one or more clients 408. For ease of illustration, only one client 408 is shown in FIG. 4. Client 408 includes a key access frequency max-heap 410. In this embodiment, the client 408 accesses one or more records from the database memory 406 via a RDMA protocol, thereby bypassing the database access mechanism 405. In this embodiment, client 408 periodically sends a message for a set of records that have reached a minimum or a maximum access threshold (e.g., accessed record #1 six times, accessed record #5 ten times, etc). Instead of sending one message per record that has reached the threshold number of accesses, access frequency data is aggregated for one or more records that has reached the threshold value, and a single message is sent periodically for this set of records that has reached the threshold number of accesses. Furthermore, the records may be sorted such that messages are sent in order of activity, that is, from most active to least active. In this way, the utility of the message is maximized. In an illustrative example, an algorithm on the client 408 may periodically send out a request to key access frequency max-heap 410 for the most active records, e.g., records that have been frequently accessed recently. A message containing access frequency data for those identified records is sent to database system 402, and the counter for those records are reset at client 408. Subsequently, the algorithm may send another request to key access frequency max-heap 410 for another set of active records that have been accessed recently, and for which a message has not yet been sent to database system 402. Notably, the frequency of the messages from the client 408 to the database system 402 may vary according to the application. For example, when a request for a set of records is sent to the key access frequency max-heap 410 for a set of records, it may be that there are no records that have reached the specified threshold, and a message will not be sent out. As another example, the request for a set of records may return so many records that it would be more practical to send multiple messages. As such, the number of messages to be sent may vary and the threshold value may also be adjusted accordingly.

Figure 5:
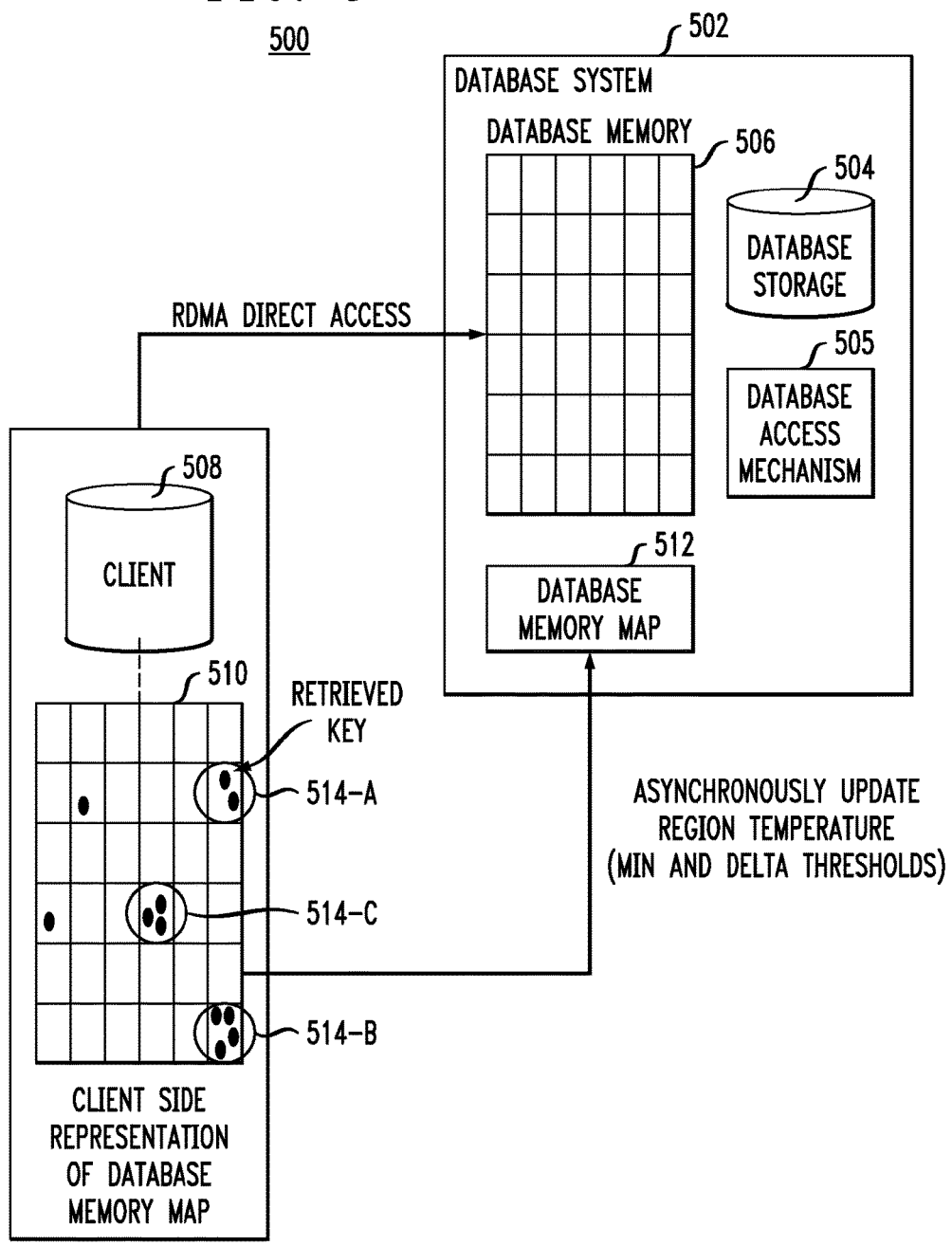
FIG. 5 depicts a database system environment implementing the method of FIG. 2, according to another embodiment of the invention.

FIG. 5 depicts another embodiment of the process 200 as implemented in a database system environment. Database system environment 500 comprises database system 502, which includes database storage 504, database access mechanism 505, database memory 506 and a database memory map 512. In this embodiment, the client 508 accesses one or more records from the database memory 506 via a RDMA protocol, thereby bypassing the database access mechanism 505. In an illustrative embodiment, the database memory map 512 may be a heat map representing the respective temperatures of each region within the database memory 506. As shown, the database memory 506 is divided into regions, i.e., boxes, each box containing one or more records. The boundaries of the boxes are defined as, for example, every five records, ten records, 10 bytes, 32 kilobytes, 40 kilobytes, etc. The database system environment 500 also includes one or more clients 508. For ease of illustration, only one client 508 is shown in FIG. 5. Client 508 includes a client side representation of the database memory map 512, shown as map 510, for tracking the client's access frequency for one or more records. In this embodiment, instead of keeping track of each record, the access frequency of each box is tracked. Specifically, the "temperature" of each box is tracked. A box increases in temperature as the access frequency of the records within the box increases. The temperature of the boxes may be represented in degrees. As such, a "hot" box represents an active box whose records are accessed frequently and/or recently. Temperature may be measured based on the activity, e.g., a number of accesses. Temperature may be measured by using a temperature counter assigned to each region.

It is to be noted that the boxes on map 510 are virtual representations of the database memory map 512 on the database system 502. Therefore, the regions on map 510 are correlated to the regions in database memory map 512, and the exact boundaries of the boxes are known. While map 510 may not represent access frequencies for every record within a box, map 510 represents and tracks the records that are accessed within a specific box by client 508. For example, client 508 reads a record, knows it is located in the second row, last column, as shown in circle 514-A, based on the established boundaries. If a box is very active, that is, the records within the box are accessed frequently, the temperature of the box incrementally increase. For example, the temperature of a box may increase five degrees each time a record is accessed within that particular box. When the temperature of a box reaches a certain threshold "hotness", the client 508 may send a message to database system 502 to report the access frequency data for the particular box. Furthermore, if the temperature of a box changes by a certain delta (e.g., the temperature increases or decreases by a specific number of degrees), access frequency data for the box may also be reported to the database system 502. Alternatively, instead of sending one message for each box that has reached a threshold temperature or whose temperature has changed by a certain delta, client 508 may periodically send one message for a set of boxes meeting those reporting criteria. For example, assume that each time a record is accessed within a box, it is represented by one dot in map 510, that the temperature of a box increases five degrees each time a record is accessed and that a threshold temperature has been set at 10 degrees. As shown in FIG. 5, map 510 has three boxes, box 514-A, 514-B and 514-C that has each reached the threshold temperature. The client 508 may send one message to database system 502 that includes the access frequency data for all three boxes 514-A, 514-B and 514-C.

Accordingly, a box becomes a candidate for reporting if: 1) the temperature of the box reaches a certain threshold (e.g., 75 degrees); or 2) the temperature of the box decreases or increases by a certain delta (e.g., decreased by 20 degrees). Therefore, a client may report the access frequency of a box once it reaches the specified threshold temperature, and re-report the access frequency of that particular box subsequently if the temperature increases or decreases a certain delta.

It is to be noted that in this embodiment, the client has to understand the memory space and the boundaries of the database memory map 512 in order to properly report the access frequency data. Furthermore, the database system 502 has multiple clients with each client reporting access frequency information for the one or more boxes in the database memory 506. As such, the database system 502 has to combine the information received for each box coming from different clients in order to understand the full picture for each box. The updates from the clients are performed asynchronously and periodically. Based on the updated access frequency data from the one or more clients, the database system 502 may update its own database memory map 512 and implement its database memory replacement policy more accurately.

Embodiments of the present invention may be a system, a method, and/or a computer program product. The computer program product may include a computer readable storage medium (or media) having computer readable program instructions thereon for causing a processor to carry out aspects of the present invention.

Figure 6:
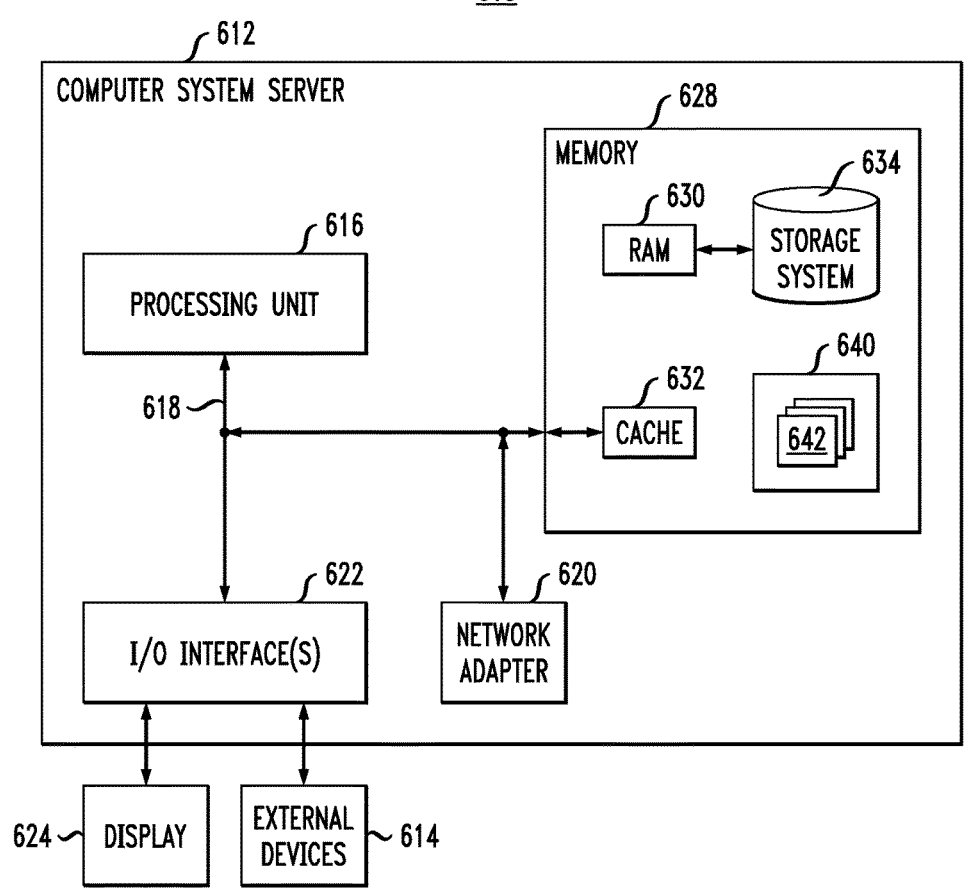
FIG. 6 depicts a computer system in accordance with which one or more components/steps of techniques of the invention may be implemented according to an embodiment of the invention.

Accordingly, the architecture shown in FIG. 6 may be used to implement the various components/steps shown and described above in the context of FIGS. 1-5.

Any combination of one or more computer readable storage medium may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

One or more embodiments can make use of software running on a general-purpose computer or workstation. In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

It is understood in advance that although this disclosure includes a detailed description on cloud computing below, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Computer system/server 612 in FIG. 6 is an example of a cloud computing node. It is to be appreciated, however, that the computer system/server 612 in FIG. 6 is only one example of a suitable cloud computing node and is not intended to suggest any limitation as to the scope of use or functionality of embodiments of the invention described herein. Regardless, the computer system/server 612 is an example of a cloud computing node capable of being implemented and/or performing any of the functionality set forth hereinabove.

Figure 7:
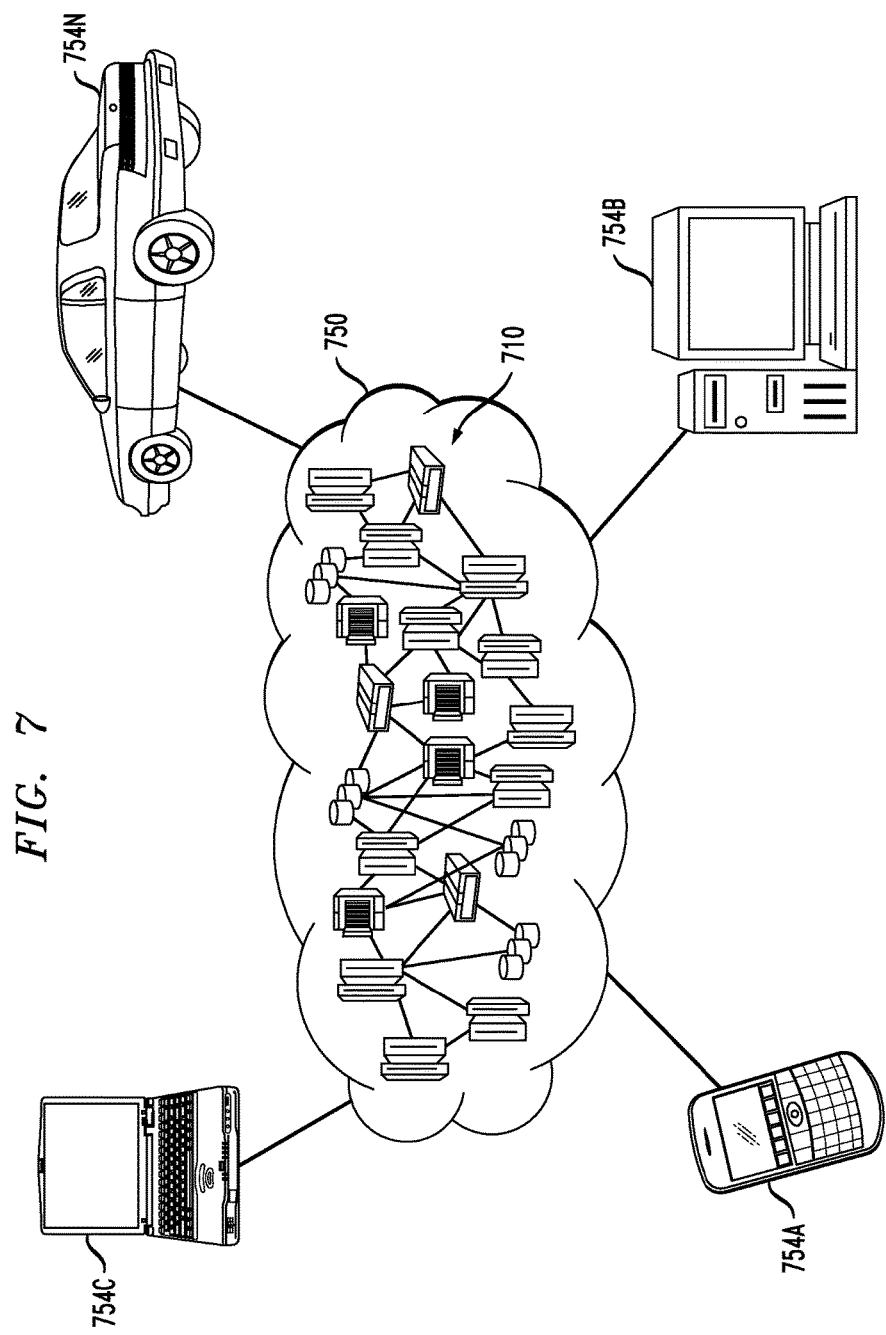
FIG. 7 depicts a cloud computing environment, according to an embodiment of the invention.

Referring now to FIG. 7, illustrative cloud computing environment 750 is depicted. As shown, cloud computing environment 750 comprises one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
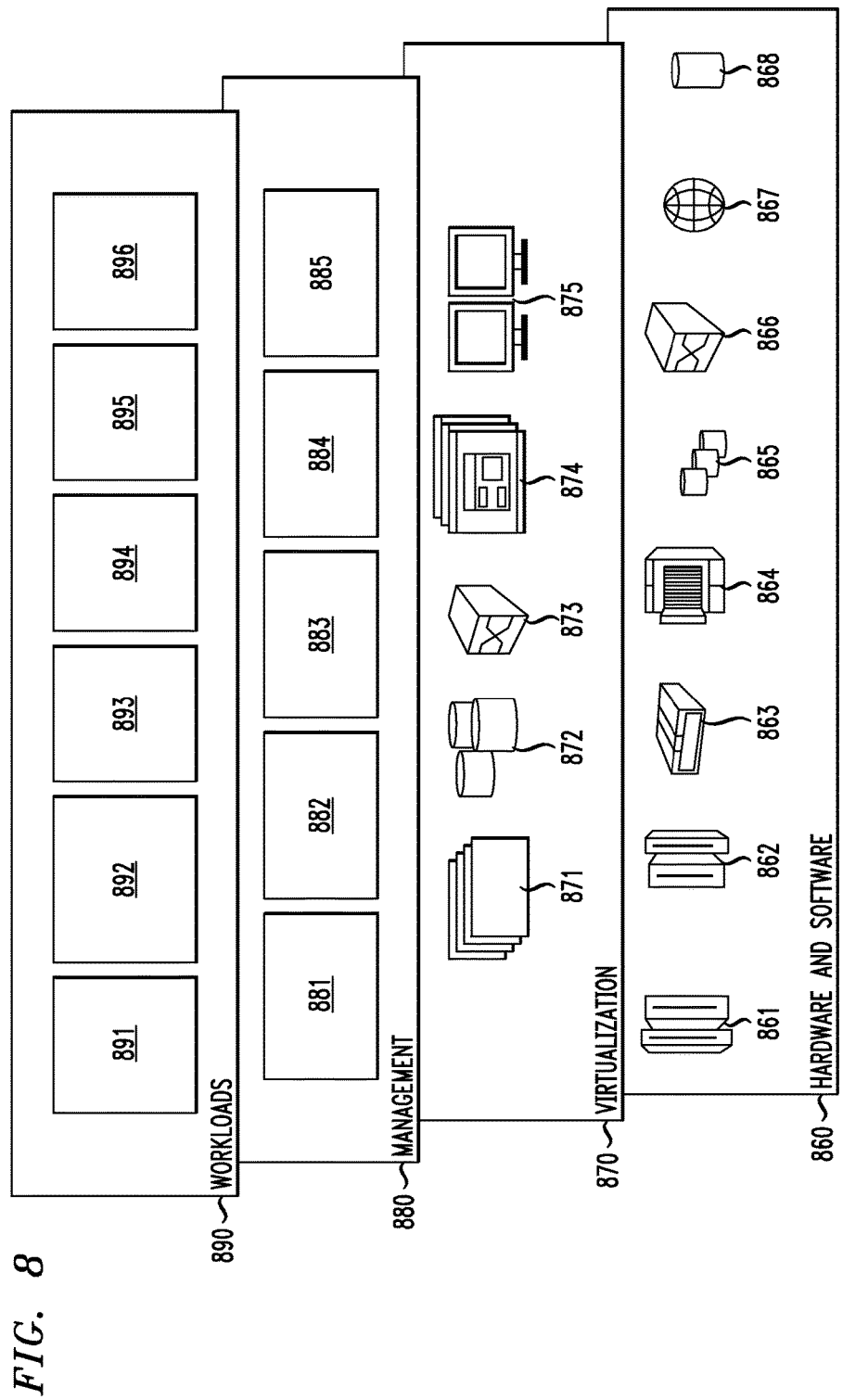
FIG. 8 depicts abstraction model layers according to an embodiment of the invention.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and object detection and tracking 896, which may implement the functionality described above with respect to FIGS. 1-5.

What is claimed is:

1. A method, comprising the steps of:
    accessing one or more records from a database storage through a database access mechanism of a database system, wherein the one or more accessed records are stored in a database memory;
    accessing one or more of the accessed records from the database memory bypassing the database access mechanism of the database system, wherein the accessing comprises a remote direct memory access;
    collecting data representing access frequency of the one or more accessed records;
    maintaining the collected access frequency data for the one or more accessed records;
    aggregating the access frequency data for the one or more accessed records until the access frequency reaches an access threshold value; and
    asynchronously reporting the aggregated access frequency data for the one or more accessed records to the database system;
    wherein the steps are performed by at least one processor device coupled to a memory.

2. The method of claim 1, further comprising updating one or more access frequency data structures in the database system.

3. The method of claim 1, wherein the accessing step comprises one of reading from or writing to the one or more accessed records.

4. The method of claim 1, wherein the collecting step comprises collecting access frequency data for each of the one or more accessed records.

5. The method of claim 4, wherein the reporting step comprises sending one message for each of the one or more accessed records comprising an aggregated access frequency that reached the threshold value.

6. The method of claim 4, wherein the reporting step comprises sending one message for a set of accessed records, each accessed record within the set of accessed records comprising an aggregated access frequency that reached the threshold value.

7. The method of claim 1, further comprising constructing a virtual memory map locally at a client device, the virtual memory map comprising one or more regions corresponding to one or more regions of a database memory map of the database memory.

8. The method of claim 7, wherein each of the one or more regions comprises a boundary set at one of a specified number of records and a specified number of bytes of data.

9. The method of claim 8, wherein each of the one or more regions comprises a temperature associated therewith.

10. The method of claim 9, wherein the temperature associated with each of the one or more regions is updated each time a record is accessed within the respective region.

11. The method of claim 10, wherein the threshold value represents one of a threshold temperature and a delta change in temperature.

12. The method of claim 11, wherein a message is sent for each of the one or more regions that reached one of a threshold temperature and a delta change in temperature.

13. The method of claim 11, wherein a message is sent for a set of regions, each region within the set of regions having reached one of a threshold temperature and a delta change in temperature.

14. The method of claim 11, wherein the aggregated access frequency data represents the respective temperature associated with each of the one or more regions.

15. The method of claim 14, further comprising updating respective temperatures associated with the one or more regions of the database memory map based on the aggregated access frequency data received.

16. An apparatus, comprising:
    a memory; and
    a processor operatively coupled to the memory and configured to:
        access one or more records from a database storage through a database access mechanism of a database system, wherein the one or more accessed records are stored in a database memory;
        access one or more of the accessed records from the database memory bypassing the database access mechanism of the database system, wherein the accessing comprises a remote direct memory access;
        collect data representing access frequency of the one or more accessed records;
        maintain the collected access frequency data for the one or more accessed records;

aggregate the access frequency data for the one or more accessed records until the access frequency reaches an access threshold value; and asynchronously report the aggregated access frequency data for the one or more accessed records to the database system.

17. A method, comprising:

accessing one or more records from a database storage through a database access mechanism of a database system, wherein the one or more accessed records are stored in a database memory accessing one or more of the accessed records maintained in the database memory, wherein the one or more records are accessed by a remote direct memory access;

maintaining one or more access frequency data structures for the one or more accessed records in the database memory;

employing a database memory replacement policy; and asynchronously receiving access frequency data for the one or more accessed records in the database memory from one or more clients.

18. The method of claim 17, further comprising updating the one or more access frequency data structures based on the access frequency data received from the one or more clients.

19. The method of claim 18, further comprising implementing the database memory replacement policy based on the one or more updated access frequency data structures.

* * * * *